Oct. 14, 1958  B. A. ZIEBARTH  2,856,195
HAND TRUCK
Filed Feb. 23, 1956  2 Sheets-Sheet 1
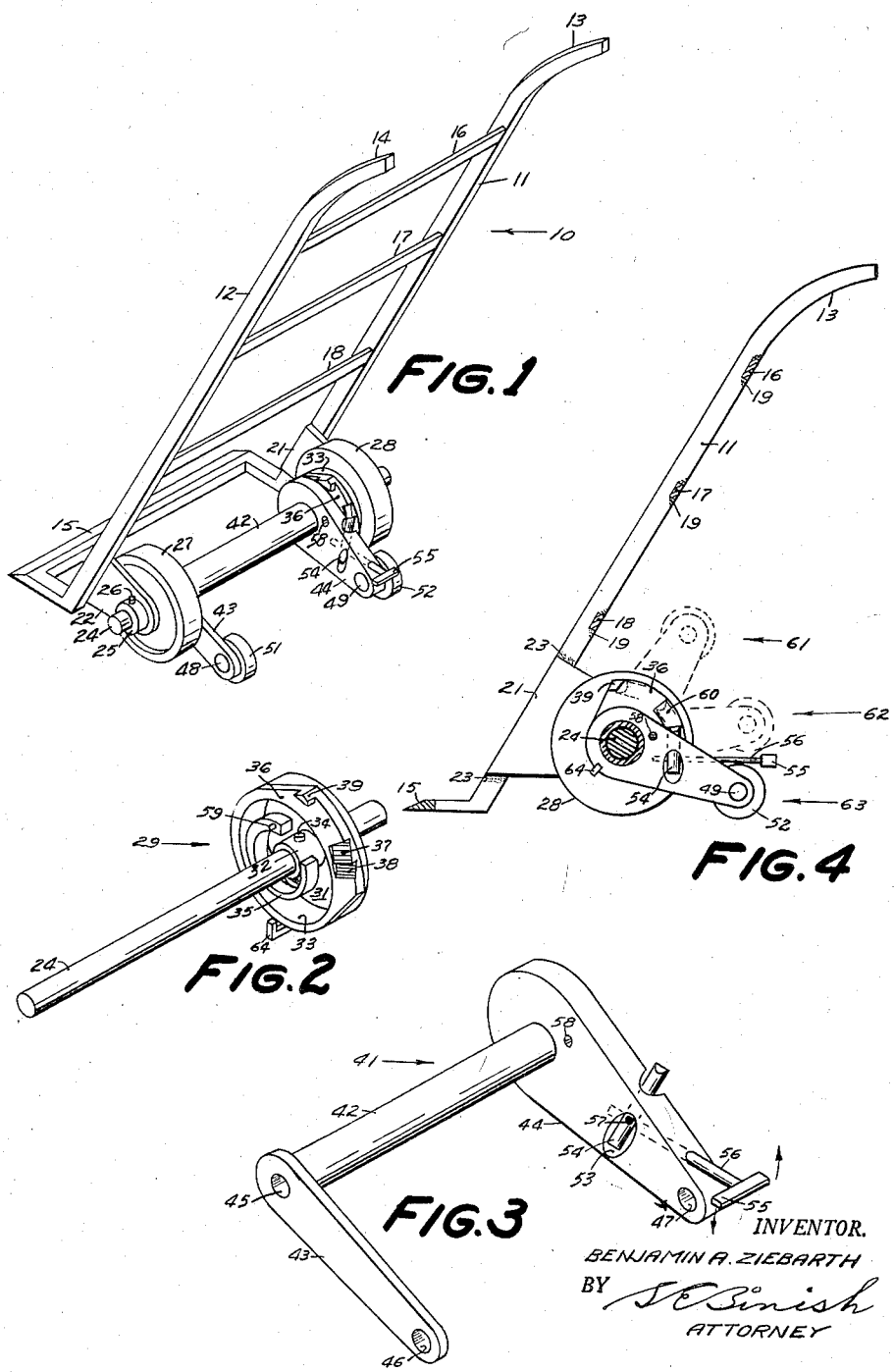
INVENTOR.
BENJAMIN A. ZIEBARTH
BY
ATTORNEY Oct. 14, 1958

B. A. ZIEBARTH 2,856,195

HAND TRUCK

Filed Feb. 23, 1956

INVENTOR.
BENJAMIN A. ZIEBARTH
BY
ATTORNEY

United States Patent Office 2,856,195
Patented Oct. 14, 1958

2,856,195
HAND TRUCK
Benjamin A. Ziebarth, Green Bay, Wis.
Application February 23, 1956, Serial No. 567,143
3 Claims. (Cl. 280—47.2)

This invention relates generally to hand trucks, and more particularly to a hand truck having retractile and adjustable supplemental wheels readily available for selectively lifting the truck over ordinary obstructions such as door sills, curbs, elevated floor surfaces and the like, or for stabilizing the truck in a relatively upright position.

This invention relates generally to hand trucks, and more particularly to a hand truck having retractile supplemental wheel member readily available for selective positionment.

The purpose of this invention is to provide a hand truck with improved and simplified means for the dual purpose of stabilizing a hand truck in a relatively upright position and also for lifting the truck over ordinary obstructions such as door sills, curbs, elevated floor surfaces, and the like.

An object of this invention is the provision of a hand truck having retractile supplemental wheel means controllable by a foot of the truck operator.

Another object is to provide a hand truck having retractile supplemental wheel means selectively positionable by a foot of the truck operator.

Still another object of this invention is the provision of a hand truck having retractile supplemental wheel means automatically retractive.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 is a perspective view of a hand truck equipped with the retractile means embodying the invention;

Fig. 2 is a perspective view of a truck axle showing mounted thereon a housing member embodied in the invention;

Fig. 3 is a perspective view of the movable portion of the retractile means;

Fig. 4 is a central vertical section view through the hand truck shown in Fig. 1;

Figure 5:
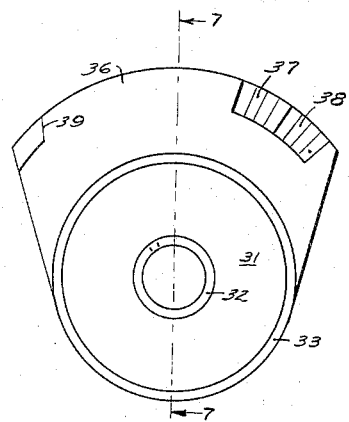
Fig. 5 is a front elevation view of the spring housing and teeth thereon.
Figure 7:
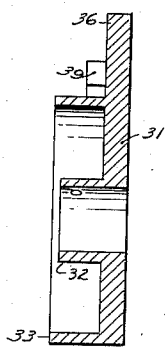
Fig. 7 is a longitudinal section taken along line 7—7 of Fig. 5.
Figure 6:
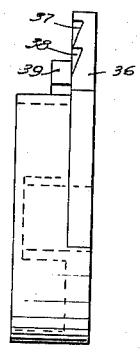
Fig. 6 is a side elevation view of the spring housing shown in Fig. 5.

Referring now to the drawings, wherein like reference characters designate like or corresponding parts throughout the several views, there is shown in Fig. 1 a main frame or body portion, generally indicated at 10, comprising substantially parallel side members 11 and 12, terminating at the upper end in curved handle portions 13 and 14, and terminating at the lower end with a toe iron 15 mounted across the ends thereof. A plurality of spaced braces 16, 17 and 18 are mounted across the side members as by welding 19.

A pair of companion plate brackets 21 and 22 are secured to the lower ends of side members 11 and 12, respectively, as by welding 23. These axle brackets project rearwardly of the main frame 10, and are provided with suitable integral bosses such as indicated at 25. Said brackets and bosses are furnished with axially aligned bores to receive axle 24 rigidly fixed therein by suitable pins such as indicated at 26.

Wheels 27 and 28 are journalled on shaft 24 and disposed adjacent the inner faces of the axle brackets, respectively. Said wheels are operative to roll on a floor surface.

A pulley-like housing or supporting means generally indicated at 29, comprising a web 31, an inwardly projecting central hub 32 thereon, and an inwardly projecting rim or flange 33, is anchored on axle 24, adjacent wheel 28, by means of pin 34. The hub and rim are disposed on one side only, of the web, and on the same side thereof.

Said rim or flange 33 is provided with a projecting face plate 36 having a pair of circumferentially-disposed engageable teeth 37 and 38 formed in the face thereof.

A stop lug 39, circumferentially aligned with teeth 37 and 38, and spaced therefrom, is formed integral with the face plate, and serves the purpose hereinafter described.

Within said housing is disposed a spring, such as a tension spring, compression spring, or leaf spring 35, or the like, operable to normally urge arm 44 against stop 39, as hereinafter described. Said spring is secured to hub 32 by any means, such as by welding.

The retractive member generally indicated at 41, comprises a sleeve 42 receivable over axle 24, and parallel arm members 43 and 44 fixed on the opposite ends thereof, the larger arm member 44 being disposed adjacent the housing 29 and face plate 36, and the smaller arm 43 adjacent the wheel 27. The arm members are provided with the same bore as the sleeve, such as indicated at 45, to allow for the axle projecting therethrough.

The free ends of the arms 43 and 44 are provided with aligned bores 46 and 47 to receive shafts 48 and 49 press-fit therein. On said shafts are rotatably mounted small wheels 51 and 52, respectively, operative to roll on a floor surface.

The inner end portion of arm 44 is sufficiently large to cover and engage the free edge of rim 33.

An oblique bore 53 is provided in member 44 to loosely receive therein a releasable pawl 54 actuable by a foot pedal 55. The foot pedal 55 is furnished with a stem 56 rotatably received in a bore communicating with pawl bore 53, and extending a short distance therebeyond. An end portion of said stem 56 is received in a bore provided in the pawl 54, and fixed thereto by set screw 57. The very end of the stem bottoms against the bore terminus, in thrust-bearing relation thereagainst. By pivoting the foot pedal clockwise or counterclockwise, a corresponding motion is communicated to the pawl through means of the connecting stem 56.

The retractive member 41, and more particularly the arm 44, is connected to the curved spring 35 through means of screw 58 threadedly engaged in spring bore 59, and is normally tensioned to urge and bias the arm 41 against the stop lug 39, out of the way of the operator's feet and legs.

The pawl 54 is adapted to engage the teeth 37 and 38, and the stop lug 39, selectively, depending upon the operator's actuation of the pedal 55, by means of his foot.

An upturned lug 64, mounted on rim 33, slidably engages arm 44 to prevent displacement of the arm from the housing. Said lug 64 is secured to rim 33 by any removable means such as a screw.

Spring 35 can be initially tensioned by any of several methods, including the insertion of boss pins 26 as one of the last steps in the assembly of the device, when shaft 24 is rotated slightly against the action of spring 35 to initially tension arm 44 against stop 39. The bores in the bosses and shaft, to receive said pins, are provided to register accordingly.

*Operation.*—Normally, the retractive member generally indicated at 41, and the arm 44 in particular, is urged against stop lug 39 by spring 35. This normal uppermost position is shown in broken lines, indicated generally at 61, in Fig. 4.

When the operator of the hand truck meets a raised surface, or the like, on or over which he must lift the truck, he places his foot on the pedal 55, forcing the retractile member downwardly, against the tension of spring 35, until pawl 54 engages tooth 37, as shown at 60, Fig. 4. The retractile member, and arm 44 in particular, then assumes the broken line position, indicated generally at 62, in Fig. 4. The handle end of the truck is then lowered, allowing the forward truck wheels 27 and 28 to be raised above or onto the elevated floor surface, the small rear wheels 51 and 52 being employed as fulcrums. The handle end is then raised, and the truck moved forwardly, with the large wheels rolling on the elevated surface. After the fulcrum wheels 51 and 52 have served their purpose, the operator applies his foot to the pedal 55, disengages the pawl 54 from tooth 37, and allows the spring 35 tension to urge the arm 44 against the stop lug 39, and out of the way of the operator's feet and legs.

In the event the operator desires to stabilize the truck in a relative upright position, he places his foot on the pedal 55, forcing the retractile member downwardly from its normal position against stop 39, against the tension of spring 35, until pawl 54 engages tooth 38. The retractile member 41 and, arm 44 in particular, then assumes the solid line position generally indicated at 63, in Fig. 4. In this position, the toe iron 15, paired truck wheels 27 and 28, and paired fulcrum wheels 51 and 52 all rest on the same surface, thereby stabilizing the hand truck in a relative upright position, which would otherwise fall backward but for the stabilizing effect of paired fulcrum wheels 51 and 52.

When the stabilizing arrangement has served its purpose, the operator can restore the retractile member to its normal position against the stop lug 39 by applying his foot to the pedal 55, pivotally actuating said pedal so as to disengage the pawl from tooth 38, and allowing the retractile assembly to be automatically retracted and urged against the stop lug 39 by the action of spring 35.

Obviously, the truck can be adapted for stabilization with a load as well as without a load.

The characteristic feature of this truck invention is the provision of retractile supplemental wheel means, readily available for selective positionment, the retractile means being controllable by a foot pedal operable by the foot of the operator.

Obviously many modifications and variations of the present invention are possible in the light of the above teachings. It is therefore to be understood, that within the scope of the appended claims, the invention may be practised otherwise than as specifically described.

What is claimed and desired to be protected by Letters Patent of the United States is:

1. A hand truck, comprising: a frame having upper and lower ends; an axle mounted rotatively-rigid on the lower end portion of said frame; spaced supporting wheels rotatably mounted on said axle; supporting means fixed on said axle; teeth on said supporting means circumferentially disposed relative to said axle; retractile arm means, rotatably mounted on said axle and extending rearwardly thereof; supporting wheels on said retractile arm means; a foot pedal mounted on said retractile arm means; a pawl controlled by said foot pedal and selectively engageable with said teeth; and spring means interposed between said supporting means and said retractile arm means, for biasing said retractile arm means upwardly.

2. A hand truck, comprising a frame having upper and lower ends; an axle mounted rotatively-rigid on the lowed end portion of said frame; spaced supporting wheels rotatably mounted on said axle, for engagement with a supporting surface; a housing member fixed on said axle, adjacent one of the wheels, said housing having teeth on the face thereof circumferentially disposed relative to said axle, and a stop lug circumferentially aligned with and spaced forwardly of said teeth; a sleeve on said axle, between said housing and the other wheel; a pair of spaced parallel arms, rigidly mounted on said sleeve, adjacent said other wheel and housing member, respectively, and extending rearwardly; wheels rotatably mounted on the ends of said arms, for engagement with a supporting surface; a foot pedal lever rotatably mounted on the arm adjacent the housing member; a pawl on said foot lever selectively engageable with said teeth and stop lug; and a spring connecting said housing member and said arm adjacent said housing member, for biasing said arm, and normally urging it against said stop lug.

3. Retractile truck supporting means for a hand truck having a rotatively-rigid axle, comprising: a supporting means adapted to be fixed on said axle; teeth supported on said supporting means, said teeth disposed circumferentially relative to said axle; retractile arm means adapted to be pivotally mounted on said axle and extendable rearwardly thereof; pawl means on said retractile arm means releasably engageable with said teeth for maintaining said retractile arm means in extended operative position; actuable means for controlling said pawl; and spring means interposed between said supporting means and said retractile arm means for retracting said retractile arm into inoperative position.

References Cited in the file of this patent

UNITED STATES PATENTS

| 627,284 | Walker | June 20, 1899 |
| 902,794 | Anderson | Nov. 3, 1908 |
| 1,270,024 | Evenson | June 18, 1918 |
| 1,890,469 | Powers | Dec. 13, 1932 |
| 2,361,674 | Zeindler | Oct. 31, 1944 |

FOREIGN PATENTS

| 27,398 | Denmark | Apr. 4, 1921 |